(12) United States Patent
Sterns et al.

(10) Patent No.: US 10,094,466 B2
(45) Date of Patent: Oct. 9, 2018

(54) GEAR UNIT

(71) Applicants: Dietmar Sterns, Kissing (DE); Jürgen Weigand, Schwabmünchen (DE); Oliver Kraus, Augsburg (DE)

(72) Inventors: Dietmar Sterns, Kissing (DE); Jürgen Weigand, Schwabmünchen (DE); Oliver Kraus, Augsburg (DE)

(73) Assignee: RENK Aktiengesellschaft, Augsburg (DE)

( * ) Notice: Subject to any disclaimer, the term of this patent is extended or adjusted under 35 U.S.C. 154(b) by 173 days.

(21) Appl. No.: 15/130,554

(22) Filed: Apr. 15, 2016

(65) Prior Publication Data

US 2016/0305537 A1 Oct. 20, 2016

(30) Foreign Application Priority Data

Apr. 18, 2015 (DE) .................. 10 2015 004 991

(51) Int. Cl.
*F16H 57/04* (2010.01)
*F16H 57/027* (2012.01)
*F16H 57/02* (2012.01)

(52) U.S. Cl.
CPC ......... *F16H 57/0435* (2013.01); *F16H 57/02* (2013.01); *F16H 57/027* (2013.01); *F16H 57/04* (2013.01); *F16H 57/0436* (2013.01); *F16H 57/0471* (2013.01)

(58) Field of Classification Search
CPC .... F16H 57/0435; F16H 57/02; F16H 57/027; F16H 57/04; F16H 57/0436; F16H 57/0471
See application file for complete search history.

(56) References Cited

U.S. PATENT DOCUMENTS

| | | | | |
|---|---|---|---|---|
| 2,064,703 A | * | 12/1936 | Van De Graaff | ........ F16J 15/40 277/430 |
| 3,489,034 A | * | 1/1970 | Moore | .................. F16H 57/027 74/606 R |
| 3,800,913 A | * | 4/1974 | Schmitt | ..................... F01M 1/12 184/6.13 |
| 4,168,638 A | * | 9/1979 | Usui | ................... F16H 61/0021 475/136 |

(Continued)

FOREIGN PATENT DOCUMENTS

| | | |
|---|---|---|
| DE | 22 56 681 | 6/1974 |
| DE | 198 60 353 | 6/2000 |

*Primary Examiner* — Michael A Riegelman
(74) *Attorney, Agent, or Firm* — Cozen O'Connor

(57) ABSTRACT

Gear unit with a gear unit housing, a drive-side and an output-side shaft and a gear ratio stage. The gear unit housing has a toothing space in which there are intermeshing toothed wheels and a bearing space separated from the toothing space. The bearing space in which bearing lubricating oil can be collected is operated under atmospheric pressure. The bearing lubricating oil is guided from the bearing space to an oil collecting receptacle external to the gear unit. The toothing lubricating oil collected in the toothing space is fed to the oil collecting receptacle to be at least partially separated from the bearing lubricating oil. In partial vacuum operation the toothing lubricating oil is conveyed from the toothing space into the oil collecting via a delivery pump, and in atmospheric operation, the toothing lubricating oil is conveyed from the toothing space into the oil collecting receptacle via a check valve.

12 Claims, 2 Drawing Sheets

(56) References Cited

U.S. PATENT DOCUMENTS

| | | | | |
|---|---|---|---|---|
| 4,465,030 | A * | 8/1984 | Maurer | F16H 57/027 |
| | | | | 123/1 R |
| 4,632,650 | A * | 12/1986 | Frieden | F04C 27/009 |
| | | | | 277/412 |
| 4,697,553 | A * | 10/1987 | Lie | F01M 3/00 |
| | | | | 123/196 R |
| 4,750,456 | A * | 6/1988 | Ladrach | F01M 11/061 |
| | | | | 123/196 S |
| 4,762,201 | A * | 8/1988 | Malik | F01M 1/12 |
| | | | | 184/6.13 |
| 4,821,799 | A * | 4/1989 | Wong | E21B 33/072 |
| | | | | 166/385 |
| 5,101,936 | A * | 4/1992 | Paredes | F01M 1/12 |
| | | | | 123/196 S |
| 6,374,949 | B2 * | 4/2002 | Schwertberger | F16H 57/027 |
| | | | | 184/6.4 |
| 6,457,564 | B1 * | 10/2002 | Damm | F01M 11/04 |
| | | | | 184/1.5 |
| RE38,232 | E * | 8/2003 | Rome | F01M 11/0458 |
| | | | | 141/59 |
| 8,997,934 | B2 * | 4/2015 | Nielsen | F03D 11/0008 |
| | | | | 184/4 |
| 2002/0017432 | A1 * | 2/2002 | Schwertberger | F16H 57/027 |
| | | | | 184/6.4 |
| 2005/0139427 | A1 * | 6/2005 | Antonetti | F16H 57/0413 |
| | | | | 184/6.12 |
| 2009/0050410 | A1 * | 2/2009 | Berberich | F01D 11/003 |
| | | | | 184/6.11 |
| 2016/0160856 | A1 * | 6/2016 | Wallin | F04B 53/18 |
| | | | | 62/468 |
| 2016/0369886 | A1 * | 12/2016 | Sterns | F16H 57/0435 |

* cited by examiner

GEAR UNIT

BACKGROUND OF THE INVENTION

1. Field of the Invention

The invention is directed to a gear unit.

2. Description of the Related Art

A gear unit with a gear unit housing, a drive-side shaft, an output-side shaft, and at least one gear ratio stage having intermeshing toothed wheels is known from DE 198 60 353 C1. The gear unit housing has chambers or spaces that are separated from one another via seals. Accordingly, intermeshing toothed wheels are positioned in a toothing space that can be operated under partial vacuum. In partial vacuum operation, toothing lubricating oil can be directed to the intermeshing toothed wheels of the respective gear ratio stage. A bearing space always operated under atmospheric pressure is separated from this toothing space, and bearing lubricating oil can be directed to the bearing inside the bearing space to lubricate the bearing. In known gear units, the toothing lubricating oil needed for lubrication in the toothing space and the bearing lubricating oil needed for lubrication in the bearing space are removed from the gear unit via a common return, specifically in direction of an oil collecting receptacle external to the gear unit. To this end, it is necessary to provide a further gear unit space in the gear unit, in which the toothing lubricating oil can be collected together with the bearing lubricating oil so as to guide it via a common oil return in direction of the oil collecting receptacle external to the gear unit. This necessitates a relatively complex construction of the gear unit. Therefore, there is a need for a gear unit which is constructed in a simpler manner.

Further similar gear unit types are known from U.S. Pat. No. 3,489,034 A, DE 22 56 681 A and DE 603 016 120 T2.

SUMMARY OF THE INVENTION

On this basis, an aspect of the invention is providing a novel gear unit.

The gear unit has a gear unit housing, at least one drive-side shaft, at least one output-side shaft and at least one gear ratio stage having intermeshing toothed wheels. The gear unit housing has a toothing space in which are received intermeshing toothed wheels, and a bearing space separated from the toothing space and in which shaft bearings are arranged. The toothing space in which the toothing lubricating oil can be collected can be operated either in atmospheric operation under atmospheric pressure or in partial vacuum operation under partial vacuum pressure, whereas the bearing space in which the bearing lubricating oil can be collected is operated permanently under atmospheric pressure. The bearing lubricating oil collected in the bearing space can be guided directly proceeding from the bearing space in direction of an oil collecting receptacle external to the gear unit. The toothing lubricating oil collected in the toothing space can likewise be fed in direction of the oil collecting receptacle external to the gear unit directly proceeding from the toothing space so as to be at least partially separated from the bearing lubricating oil, namely, in such a way that in partial vacuum operation the toothing lubricating oil can be conveyed from the toothing space into the oil collecting receptacle external to the gear unit via a delivery pump, and that in atmospheric operation the toothing lubricating oil can be conveyed from the toothing space into the oil collecting receptacle external to the gear unit at least via a check valve.

According to one aspect of the invention, the bearing lubricating oil is guided from the bearing space in direction of the oil collecting receptacle external to the gear unit. Further, the toothing lubricating oil is likewise guided in direction of the oil collecting receptacle external to the gear unit from the toothing space so as to be at least partially separated from the bearing lubricating oil. Accordingly, within the meaning of the present invention, the toothing lubricating oil and the bearing lubricating oil are no longer to be collected in a corresponding chamber inside the gear unit and guided from this chamber inside the gear unit via a common oil return in direction of the oil collecting receptacle external to the gear unit; rather, the toothing lubricating oil is removed proceeding from the toothing space and the bearing lubricating oil is removed proceeding from the bearing space directly in direction of the oil collecting receptacle.

A gear unit constructed in a simpler manner can be provided in this way. The chamber inside the gear unit or outside the gear unit which is required in the prior art and that serves in the prior art to collect or combine the toothing lubricating oil and bearing lubricating oil inside or outside the gear unit housing is dispensed with. In this connection, hydraulic shut-off flaps and seals which are required in the prior art are likewise dispensed with.

In atmospheric operation, the toothing lubricating oil can preferably be conveyed from the toothing space into the oil collecting receptacle external to the gear unit via the check valve to be additionally supported via the delivery pump. Accordingly, in atmospheric operation the toothing lubricating oil can be guided in a particularly advantageous manner from the toothing space into the oil collecting receptacle external to the gear unit.

According to an advantageous further development, a first oil line leads from the toothing space in direction of the oil collecting receptacle external to the gear unit, and a check valve is associated with the first oil line. Further, a second oil line leads from the toothing space in direction of the oil collecting receptacle external to the gear unit, and the delivery pump is associated with the second oil line. A third oil line leads from the bearing space in direction of the oil collecting receptacle external to the gear unit. This embodiment of the gear unit uses simple elements to allow the toothing lubricating oil and bearing lubricating oil to be guided from the gear unit housing in direction of the oil collecting receptacle external to the gear unit so as to be separated at least partially.

According to another advantageous further development, a vacuum pump cooperates with the toothing space, and exhaust air from the vacuum pump can be discharged into a region of the gear unit that is under atmospheric pressure while providing a closed oil circuit. There is no risk that oil will reach the environment via the vacuum pump.

According to another advantageous further development, a valve cooperates with the vacuum pump, which valve can be opened when the partial vacuum pressure in the toothing space drops below a limit value in order to keep the partial vacuum pressure at the limit value, the valve being coupled with a region of the gear unit under atmospheric pressure while providing a closed oil circuit. In this way, the partial vacuum pressure in the toothing space can be adjusted in a particularly simple and reliable manner, specifically without the risk that oil will reach the environment or surrounding air will enter the inner toothing space and/or interior of the housing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are indicated in the subclaims and in the following description. Embodiment examples of the invention are described more fully with reference to the drawings without the invention being limited to these embodiment examples. The drawings show:

DETAILED DESCRIPTION OF THE PRESENTLY PREFERRED EMBODIMENTS

The invention is directed to a gear unit, for example, a turbo spur gear unit.

Figure 1:
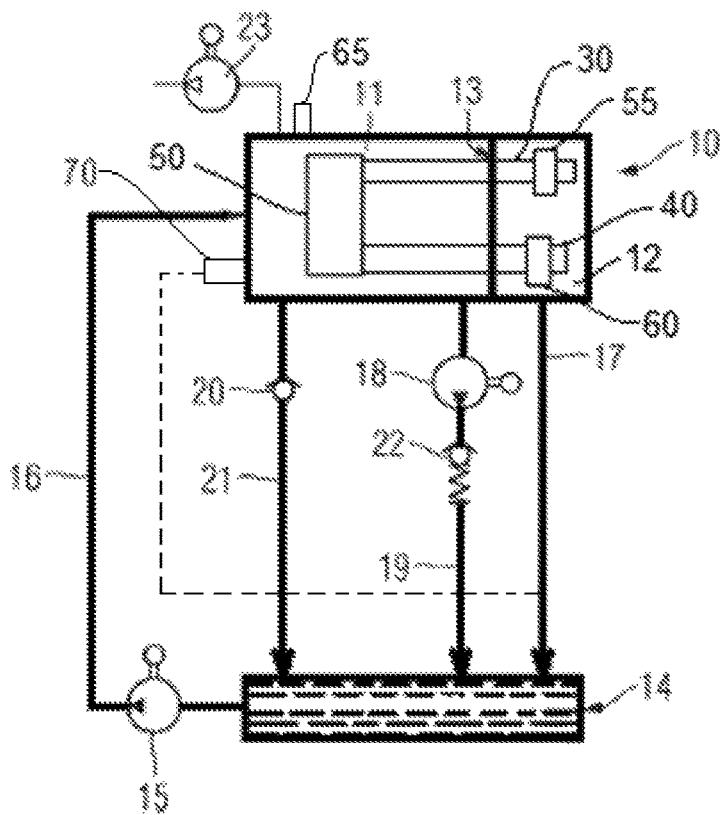
FIG. 1 is a block diagram of hydraulics-side assemblies of a first gear unit.

A gear unit of this type has a gear unit housing, 10, which is shown in a highly schematic manner in FIG. 1. Accordingly, FIG. 1 shows a toothing space 11 and a bearing space 12 of the gear unit housing 10.

The gear unit further comprises at least one drive-side shaft 30 and at least one output-side shaft 40. At least one gear ratio stage 50 with intermeshing toothed wheels is arranged between the drive-side shaft, or each drive-side shaft, of the gear unit and the output-side shaft, or each output-side shaft, of the gear unit so as to provide a defined gear ratio for the gear unit, shown schematically. The intermeshing toothed wheels of the respective gear ratio stage are positioned and received in the toothing space 11 of the gear unit housing 10. Bearings 55, 60 for shafts 30, 40 which carry these toothed wheels are received and positioned in the bearing space 12 of the gear unit housing 10.

According to FIG. 1, the toothing space 11 is separated from the bearing space 12 by a separating wall 13; the shafts 30, 40 carrying the toothed wheels of the respective gear ratio stage typically extend through the separating wall 13, and corresponding shaft passages in the separating wall 13 are sealed by seals, namely vacuum seals. Accordingly, the toothing space 11 is separated from the bearing space 12 preferably via vacuum seals.

Toothing lubricating oil is required in the toothing space 11 of the gear unit housing 10 to lubricate the intermeshing toothed wheels of the respective gear ratio stage. Bearing lubricating oil is needed in the bearing space 12 for lubricating the shaft bearings which are arranged inside the bearing space 12.

The toothing lubricating oil used for lubricating the toothed wheels and the bearing lubricating oil used for lubricating the shaft bearings is kept ready in an oil collecting receptacle 14 external to the gear unit and can be guided from the oil collecting receptacle 14 external to the gear unit in direction of the toothing space 11 and in direction of the bearing space 12 in order to lubricate the toothed wheels positioned in the toothing space 11 and the shaft bearings positioned in the bearing space 12.

FIG. 1 only shows the guiding of the toothing lubricating oil from the oil collecting receptacle 14 external to the gear unit via an oil pump 15 and an oil line 16 in direction of the toothing space 11. For the sake of simplicity, the guiding of the bearing lubricating oil from the oil collecting receptacle 14 external to the gear unit in direction of the bearing space 12 is not shown.

The toothing space 11 can be operated in a partial vacuum operation under partial vacuum pressure or, alternatively, in atmospheric operation under atmospheric pressure. To this end, a vacuum pump 23 is associated with the toothing space 11 and a defined partial vacuum pressure of, e.g., 100 mbar or even 80 mbar can be adjusted in the toothing space 11 by vacuum pump 23 in partial vacuum operation of the toothing space 11. In both partial vacuum operation and in atmospheric operation, the toothing lubricating oil guided from the oil collecting receptacle 14 external to the gear unit in direction of the toothing space 11 is sprayed in direction of the toothed wheels of the respective gear ratio stage which are to be lubricated via a so-called oil tooth sprayer.

The present invention is primarily directed to those details of the gear unit by which the toothing lubricating oil utilized for lubricating the toothed wheels and the bearing lubricating oil utilized for lubricating the shaft bearings can be removed in a defined manner from the gear unit housing 10 in direction of the oil collecting receptacle 14 external to the gear unit. Accordingly, both in partial vacuum operation and in atmospheric operation, the toothing lubricating oil collects in the toothing space 11. Likewise, the bearing lubricating oil used for lubricating the shaft bearings collects in operation in the bearing space 12 which is permanently operated under atmospheric pressure in atmospheric operation. For proper operation, both toothing lubricating oil and bearing lubricating oil must be returned or removed in direction of the oil collecting receptacle 14 external to the gear unit.

The bearing lubricating oil collecting in the bearing space 12 can be removed proceeding from the bearing space 12 directly in direction of the oil collecting receptacle 14 external to the gear unit, namely, via an oil line 17 which leads from the bearing space 12 in direction of the oil collecting receptacle 14.

The toothing lubricating oil collected in the toothing space 11 can be removed proceeding from the toothing space 11 also directly in direction of the oil collecting receptacle 14 external to the gear unit so as to be at least partially separated from the bearing lubricating oil, specifically in partial vacuum operation of the toothing space 11 and in atmospheric operation of the toothing space 11. In partial vacuum operation of the toothing space 11, the toothing lubricating oil can be guided from the toothing space 11 via a delivery pump 18 and an oil line 19 in direction of the oil collecting receptacle 14. In atmospheric operation of the toothing space 11, the toothing lubricating oil can be conveyed at least via a check valve 20 and a further oil line 21 proceeding from the toothing space 11 in direction of the oil collecting receptacle 14 external to the gear unit. The oil lines 19, 21 lead from the toothing space 11 directly in direction of the oil collecting receptacle 14 external to the gear unit.

When the toothing space 11 is operated in partial vacuum operation, the toothing lubricating oil collecting in the toothing space 11 is guided exclusively via the delivery pump 18 and oil line 19 proceeding from the toothing space 11 in direction of the oil collecting receptacle 14; the check valve 20 is permanently closed. In atmospheric operation, on the other hand, the check valve 20 is opened depending on the fill level of the toothing lubricating oil inside the toothing space 11 so that the toothing lubricating oil is guided from the toothing space 11 in direction of the oil collecting receptacle 14 via this check valve 20 and oil line 21. In atmospheric operation, the toothing lubricating oil is conveyed from the toothing space 11 via oil line 19 in direction of the oil collecting receptacle 14 external to the gear unit preferably so as to be additionally assisted via the delivery pump 18.

Preferably, a check valve 22 downstream of the delivery pump 18 is also associated with the oil line 19 with which the delivery pump 18 is associated.

Accordingly, as described above, at least three oil lines 17, 19, 21 lead from the gear unit housing 10 in direction of the oil collecting receptacle 14 external to the gear unit.

A first oil line 21 leads from the toothing space 11 in direction of the oil collecting receptacle 14, the check valve 20 being associated with this first oil line 21. A second oil line 19 likewise leads from the toothing space 11 in direction of the oil collecting receptacle 14 external to the gear unit, the delivery pump 18 and preferably the check valve 22 being associated with this second oil line 19. A third oil line 17 leads from the bearing space 12 in direction of the oil collecting receptacle 14 external to the gear unit.

Accordingly, in the gear unit according to one aspect of the invention, the toothing lubricating oil does not collect along with the bearing lubricating oil inside the gear unit or gear unit housing 10. On the contrary, the bearing lubricating oil is removed proceeding from the bearing space 12 and the toothing lubricating oil is removed proceeding from the toothing space 11 directly in direction of the oil collecting receptacle 14.

In partial vacuum operation of the toothing space 11, the partial vacuum keeps the check valve 20 associated with the oil line 21 closed. Toothing lubricating oil can be guided from the oil collecting receptacle 14 external to the gear unit via the delivery pump 15 and sprayed via an oil tooth sprayer, not shown, on the meshing toothed wheels arranged inside the toothing space 11. This toothing lubricating oil collects in the toothing space 11 and is removed from the toothing space 11 via the delivery pump 18 and oil line 19 in partial vacuum operation of the toothing space 11.

When the toothing space 11 is operated under atmospheric pressure in atmospheric operation, the check valve 20 opens by means of toothing lubricating oil collecting in the toothing space 11 depending on the fill level. In atmospheric operation, toothing lubricating oil can be removed from the oil collecting receptacle 14, likewise via the pump 15, and sprayed via the oil tooth sprayer on the toothed wheels to be lubricated. Toothing lubricating oil which collects in the toothing space 11 in atmospheric operation can be removed via the check valve 20 and the corresponding oil line 21 in direction of the oil collecting receptacle 14 so as to be assisted via the delivery pump 18 and the corresponding oil line 19.

Figure 2:
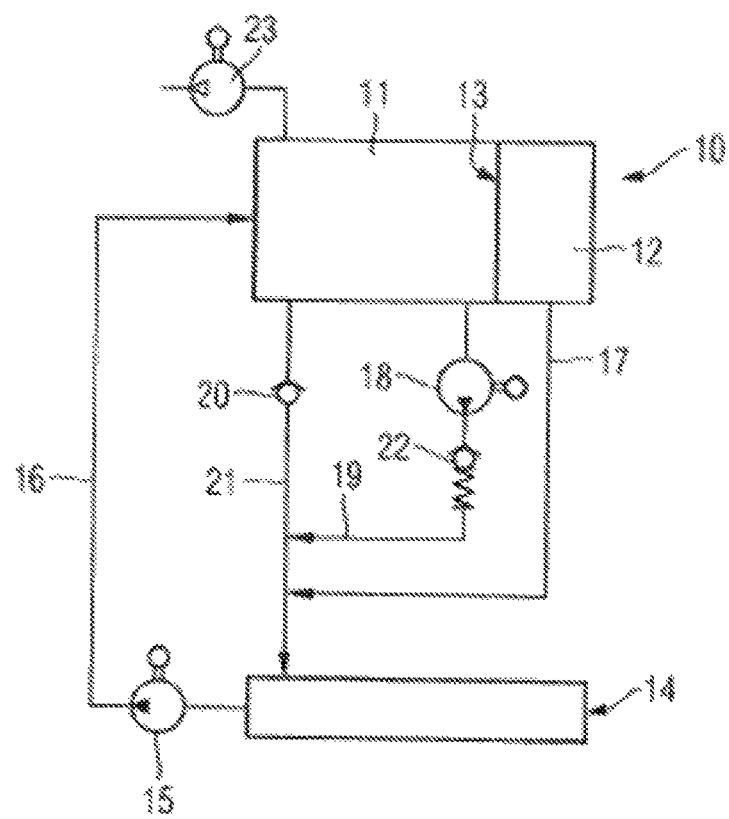
FIG. 2 is a block diagram of hydraulics-side assemblies of a second gear unit.
Figure 3:
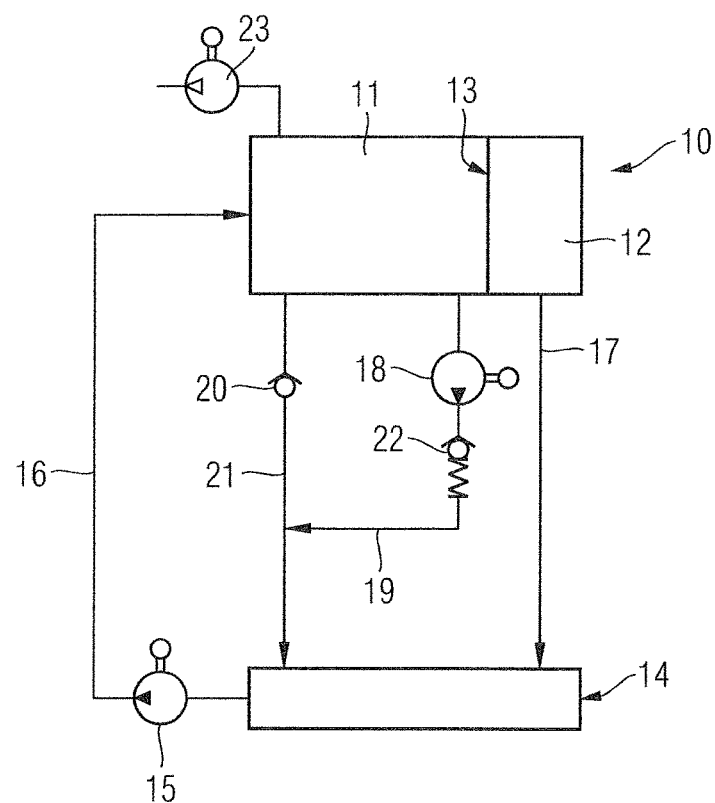
FIG. 3 is a block diagram of hydraulics-side assemblies of a third gear unit.
Figure 4:
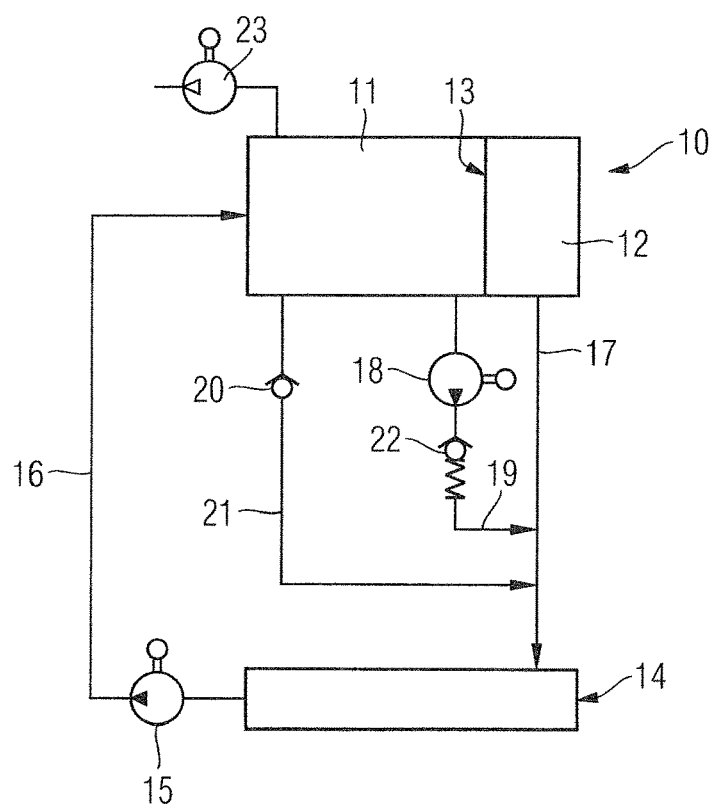
FIG. 4 is a block diagram of hydraulics-side assemblies of a fourth gear unit.

FIGS. 2 to 4 show modifications of the gear unit from FIG. 1. Accordingly, it is provided in the gear unit of FIG. 2 that the second oil line 19 and the third oil line 17 lead into the first oil line 21, specifically downstream of the check valve 20 viewed in flow direction of the oil. The preceding remarks may be referred to with regard to the rest of the details. In the variant from FIG. 3, only the second oil line 19 leads into the first oil line 21 and, irrespective of the latter, the third oil line 17 runs in direction of the oil collecting receptacle 14 external to the gear unit. The preceding remarks may be referred to with regard to the rest of the details. A further variant is shown in FIG. 4, in which the first oil line 21 and second oil line 19 lead into the third oil line 17. The preceding remarks may be referred to with regard to the rest of the details.

A further peculiarity of the gear unit according to one aspect of the invention in that, while providing a closed oil circuit, the vacuum pump 23 cooperating with the toothing space 11 returns sucked-in air into a region of the gear unit under atmospheric pressure, for example, into the bearing space 12 or the third oil line 17 or downstream of the check valve 20 into the first oil line 21 so that a closed oil circuit is provided. Then there is no risk that oil will reach the environment via the vacuum pump 23.

When there is an outage of the vacuum pump 23 and partial vacuum operation for the toothing space 11 can no longer be maintained, or when the delivery pump 18 fails in partial vacuum operation, the toothing space 11 can quickly admit atmospheric pressure via a coupling device 65. The coupling device is arranged between the toothing space 11 and a region of the gear unit under atmospheric pressure. Accordingly, the coupling device can be arranged between the toothing space 11 and the bearing space 12 or between the toothing space 11 and one of the oil lines under atmospheric pressure. Accordingly, a closed oil circuit is utilized also for pressure equilibrium in the toothing space 11 during outage of the vacuum pump 23 or outage of the delivery pump 18. No outside atmosphere is taken in for pressure equilibrium of the toothing space 11 during outage of the vacuum pump 23.

It is further provided that a valve 70 cooperates with the vacuum pump 23, which valve 70 can be opened when the partial vacuum pressure in the toothing space 11 falls below a limit value so that the partial vacuum pressure can be maintained at this limit value, for example, at approximately 200 mbar (absolute). Cavitation of the delivery pump 18 can be prevented in this way. The valve 70 is in turn coupled with a region of the gear unit under atmospheric pressure, for example, with the bearing space 12 or one of the oil lines 17, 19, 21, while forming a closed oil circuit so that in this case too there is no risk of oil reaching the environment or of outside atmosphere being sucked in.

Accordingly, within the meaning of the present invention, the toothing lubricating oil collecting in the toothing space 11 and the bearing lubricating oil collecting in the bearing space 12 are to be removed, at least proceeding from the gear unit housing 10, so as to be initially partially separate from the gear unit housing 10 in direction of the oil collecting receptacle 14 external to the gear unit.

Preferably at least three oil lines which lead from the toothing space 11 and bearing space 12 in direction of the oil collecting receptacle 14 and which can possibly be united are used for this purpose.

Exhaust air from the vacuum pump 23 and air required for aerating the toothing space 11 with atmospheric pressure during outage of the vacuum pump 23 or during outage of the delivery pump 18, as well as air needed to comply with a limit value for the partial vacuum pressure in the toothing space 11 is coupled to an atmospheric region of the gear unit while forming a closed oil circuit so that there is no risk that oil reaches the environment or the oil collecting receptacle 14 or the oil line(s) and/or that outside atmosphere is drawn in.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gear unit comprising:
    a gear unit housing with at least one drive-side shaft, at least one output-side shaft, and at least one gear ratio stage having intermeshing toothed wheels;
    a toothing space in the gear unit housing configured to receive the intermeshing toothed wheels and configured to be operated in one or more of: a partial vacuum, under atmospheric pressure, or at atmospheric pressure;
    a bearing space in the gear unit housing which is separated from the toothing space and in which shaft bearings are arranged and configured to be operated permanently in atmospheric operation under atmospheric pressure;
    lubricating oil configured to lubricate the toothing and the shaft bearings and to be collected in the toothing space and the bearing space;
    an oil collecting receptacle external to the gear unit, configured to collect the bearing lubricating oil guided from the bearing space;
    a delivery pump configured to convey the toothing lubricating oil from the toothing space into the oil collecting receptacle during partial vacuum operation;
    a check valve configured to convey the toothing lubricating oil from the toothing space into the oil collecting receptacle external to the gear unit during atmospheric operation;
    a first oil line that leads from the toothing space in direction of the oil collecting receptacle external to the gear unit, wherein the check valve is arranged in the first oil line;
    a second oil line that leads from the toothing space in direction of the oil collecting receptacle external to the gear unit, wherein the delivery pump is arranged in the second oil line; and
    a third oil line that leads from the bearing space in direction of the oil collecting receptacle external to the gear unit.

2. The gear unit according to claim 1, wherein in atmospheric operation, the toothing lubricating oil is conveyed from the toothing space into the oil collecting receptacle external to the gear unit via the check valve to be additionally supported via the delivery pump.

3. The gear unit according to claim 1, further comprising a further check valve arranged in the second oil line downstream of the delivery pump.

4. The gear unit according to claim 3, wherein the second oil line leads into one of the first oil line or the third oil line.

5. The gear unit according to claim 1, wherein the second oil line leads into one of the first oil line or the third oil line.

6. The gear unit according to claim 5, wherein one of:
    the first oil line leads into the third oil line or
    the third oil line leads into the first oil line.

7. The gear unit according to claim 1, wherein one of:
    the first oil line leads into the third oil line or
    the third oil line leads into the first oil line.

8. The gear unit according to claim 7, further comprising a vacuum pump coupled to the toothing space, wherein exhaust air from the vacuum pump is discharged into a region of the gear unit that is under atmospheric pressure while providing a closed oil circuit.

9. The gear unit according to claim 1, further comprising a vacuum pump coupled to the toothing space, wherein exhaust air from the vacuum pump is discharged into a region of the gear unit that is under atmospheric pressure while providing a closed oil circuit.

10. The gear unit according to claim 9, further comprising a coupling device between the toothing space and a region of the gear unit under atmospheric pressure, the atmospheric pressure being applied to the toothing space in partial vacuum operation via this region of the gear unit during at least outage of the vacuum pump and the delivery pump.

11. The gear unit according to claim 9, further comprising a valve cooperating with the vacuum pump, wherein the valve can be opened when the partial vacuum pressure in the toothing space drops below a limit value to keep the partial vacuum pressure at the limit value.

12. The gear unit according to claim 11, wherein the valve is coupled with a region of the gear unit under atmospheric pressure while providing a closed oil circuit.

* * * * *